United States Patent
Dom et al.

(10) Patent No.: US 9,943,809 B2
(45) Date of Patent: Apr. 17, 2018

(54) SOLVENT RESISTANT THIN FILM COMPOSITE MEMBRANE AND ITS PREPARATION

(71) Applicant: KATHOLIEKE UNIVERSITEIT LEUVEN KU LEUVEN RESEARCH & DEVELOPMENT, Leuven (BE)

(72) Inventors: Elke Dom, Heverlee (BE); Sanne Hermans, Mechelen (BE); Guy Koeckelberghs, Korbeek-Dijle (BE); Ivo Vankelecom, Oud-Heverlee (BE)

(73) Assignee: Katholieke Universiteit Leuven, Leuven (BE)

(*) Notice: Subject to any disclaimer, the term of this patent is extended or adjusted under 35 U.S.C. 154(b) by 0 days.

(21) Appl. No.: 15/121,880

(22) PCT Filed: Feb. 27, 2015

(86) PCT No.: PCT/BE2015/000005
§ 371 (c)(1),
(2) Date: Aug. 26, 2016

(87) PCT Pub. No.: WO2015/127516
PCT Pub. Date: Sep. 3, 2015

(65) Prior Publication Data
US 2017/0065937 A1   Mar. 9, 2017

(30) Foreign Application Priority Data
Feb. 27, 2014   (GB) .................................. 1403432.6

(51) Int. Cl.
| B01D 61/02 | (2006.01) |
| B01D 69/12 | (2006.01) |
| B01D 71/60 | (2006.01) |
| B01D 71/62 | (2006.01) |
| B01D 71/64 | (2006.01) |
| B01D 69/02 | (2006.01) |

(52) U.S. Cl.
CPC ......... B01D 69/125 (2013.01); B01D 61/027 (2013.01); B01D 69/02 (2013.01); B01D 71/60 (2013.01); B01D 71/62 (2013.01); B01D 71/64 (2013.01); B01D 2325/30 (2013.01)

(58) Field of Classification Search
None
See application file for complete search history.

(56) References Cited

U.S. PATENT DOCUMENTS

| 3,133,132 | A | 5/1964 | Loeb et al. |
| 3,556,305 | A | 1/1971 | Shorr |
| 3,567,810 | A | 3/1971 | Baker |
| 3,615,024 | A | 10/1971 | Michaels |
| 3,744,642 | A | 7/1973 | Scala et al. |
| 4,029,582 | A | 6/1977 | Ishii et al. |
| 4,188,354 | A | 2/1980 | Munari et al. |
| 4,265,745 | A | 5/1981 | Kawaguchi et al. |
| 4,277,344 | A | 7/1981 | Cadotte |
| 4,619,767 | A | 10/1986 | Kamiyama et al. |
| 4,761,234 | A | 8/1988 | Uemura et al. |
| 4,830,885 | A | 5/1989 | Tran et al. |
| 4,917,800 | A | 4/1990 | Lonsdale et al. |
| 4,950,404 | A | 8/1990 | Chau |
| 5,051,178 | A | 9/1991 | Uemura et al. |
| 5,085,777 | A | 2/1992 | Arthur |
| 5,234,598 | A | 8/1993 | Tran et al. |
| 2006/0135732 | A1* | 6/2006 | Yeager ............... B01D 67/0006 528/170 |
| 2008/0035575 | A1* | 2/2008 | Partridge ............... C10G 31/11 210/651 |
| 2010/0222489 | A1* | 9/2010 | Jiang .................... B01D 61/362 524/500 |
| 2013/0287944 | A1* | 10/2013 | Paul .................... B01D 67/0093 427/243 |
| 2015/0231572 | A1* | 8/2015 | Vankelecom ...... B01D 67/0013 427/337 |

FOREIGN PATENT DOCUMENTS

| CN | 1468649 A | 1/2004 |
| CN | 104190265 A | 12/2014 |
| GB | 2000720 A | 1/1979 |
| JP | 50-042121 A | 4/1975 |
| WO | WO03/008078 A2 | 1/2003 |
| WO | WO2010099387 A1 | 9/2010 |

OTHER PUBLICATIONS

Morales et al., "Combinatorial Chemistry", Division of Biology, California Institute of Technology, vol. 369, 2003.
Wang et al., "A polyamide-silica composite prepared by the sol-gel process", Polymer Bulletin, 31, 1993, pp. 323-330.
Petersen, Robert J., "Composite reverse osmosis and nanofiltration membranes", Journal of Membrane Science, 83, 1993, pp. 81-150.
Munari et al., "Casting and Performance of Polyvinylidene fluoride based membranes", Journal of Membrane Science, 16, 1983, pp. 181-193.

(Continued)

*Primary Examiner* — Krishnan S Menon
*Assistant Examiner* — Bradley R Spies
(74) *Attorney, Agent, or Firm* — Dinsmore & Shohl LLP

(57) ABSTRACT

The present invention relates to improved methods for synthesis of thin film composite membranes by interfacial polymerization. More in particular, the method of the present invention comprises the impregnation of an ultrafiltration porous support membrane with an aqueous solution containing a polyfunctional nucleophilic monomer, and contacting the impregnated support membrane with a second largely water-immiscible solvent containing a polyfunctional epoxide monomer.

8 Claims, No Drawings

(56) References Cited

OTHER PUBLICATIONS

Koops et al., "Selectivity as a Function of Membrane Thickness: Gas Separation and Pervaporation", Journal of Applied Polymer Science, 53, 1994, pp. 1639-1651.
International Search Report and Written Opinion completed Jun. 15, 2015, pertaining to PCT/BE2015/000005 filed Feb. 27, 2015.

* cited by examiner

SOLVENT RESISTANT THIN FILM COMPOSITE MEMBRANE AND ITS PREPARATION

FIELD OF THE INVENTION

The present invention relates to a method for the preparation of thin film composite (TFC) membranes by interfacial polymerization (IFP) and the TFC membranes produced by this method. More particularly, the IFP method of the present invention relates to the use of a ring-opening polymerization reaction of epoxide monomers with nucleophilic monomers for making polymer coatings on a porous support membrane, providing said novel TFC membranes.

BACKGROUND OF THE INVENTION

Membrane separation technology is of increasing importance in the separation industry. This membrane technology can be applied in the separation of a range of components of varying molecular weights in gas or liquid phases, including but not limited to nanofiltration, desalination and water treatment. The particular advantage of membrane separation is the absence of heating whereby the use of energy is significantly lower than conventional thermal separation processes (destillation, crystallization, . . . ) (Basic Principles of Membrane Technology, Second Edition, M. Mulder, Kluwer Academic Press, Dordrecht. 564 p).

Membranes are used, for instance, in separation processes as selective barriers that allow certain components to pass, i.e., the permeate, while retaining other compounds, i.e., the retentate. Membranes are used in many applications, for example as inorganic semiconductors, biosensors, heparinized surfaces, facilitated transport membranes utilizing crown ethers and other carriers, targeted drug delivery systems including membrane-bound antigens, catalyst containing membranes, treated surfaces, sharpened resolution chromatographic packing materials, narrow band optical absorbers, and in various water treatments which involve removal of a solute or contaminant for example dialysis, electrolysis, microfiltration, ultrafiltration and reverse osmosis (Membrane technology and applications, R. Baker, John Wiley & Sons, 2004, 538 p).

Although membrane separation processes are widely applied in the filtration of aqueous fluids, they have not been widely applied for the separation of solutes in organic solvents, despite the fact that organic filtrations, such as organic solvent nanofiltration, has many potential applications in industry. This is mainly due to the relatively poor performance and/or stability of the membranes in organic solvents.

Many membranes for aqueous applications are thin film composite (TFC) membranes, which can be made by interfacial polymerisation (IFP). The IFP technique is well known to those skilled in the art (Petersen, R. J. "Composite reverse osmosis and nanofiltration membranes". J. Membr. Sci, 83, 81-150, 1993). The procedures of U.S. Pat. No. 3,744,642 and U.S. Pat. No. 4,277,244 and U.S. Pat. No. 4,950,404 are illustrative of the fundamental method for preparing thin film composite (TFC) membranes. One of the earliest patents to describe membranes of the type used in the present invention, U.S. Pat. No. 3,744,642 discloses the process of reacting a broad group of aliphatic or carbocyclic primary diamines with aliphatic or carbocyclic diacyl halides on a porous support membrane to form TFC membranes.

In IFP, an aqueous solution of a reactive monomer (often a polyamine (e.g. a diamine)) is first deposited in the pores of a porous support membrane (e.g. a polysulfone ultrafiltration membrane)—this step is also referred to as support membrane impregnation. Then, the porous support membrane loaded with the first monomer is immersed in a water-immiscible (organic) solvent solution containing a second reactive monomer (e.g. a tri- or diacid chloride). The two monomers react at the interface of the two immiscible solvents, until a thin film presents a diffusion barrier and the reaction is completed to form a highly cross-linked thin film layer that remains attached to the support membrane. Since membranes synthesized via this technique usually have a very thin top layer, high solvent permeancies are expected. High flux is often associated with thin membranes, while high selectivity should not be affected by membrane thickness (Koops, G. H. et al. "Selectivity as a Function of Membrane Thickness: Gas Separation and Pervaporation" Journal of Applied Polymer Science, 53, 1639-1651, 1994). Since the first successes reached within this field by Loeb and Sourirajan, extensive research has been performed starting from their reverse osmosis membranes disclosed in U.S. Pat. No. 3,133,132. A subsequent breakthrough was achieved by Cadotte. Inspired by the work of Morgan, who was the first to describe "interfacial polymerization", Cadotte produced extremely thin films using the knowledge about interfacial polymerization, as claimed in U.S. Pat. No. 4,277,344.

The thin film layer can be from several tens of nanometers to several micrometers thick. The thin film is selective between molecules, and this selective layer can be optimized for solute rejection and solvent flux by controlling the coating conditions and characteristics of the reactive monomers. The (micro)porous support membrane can be selectively chosen for porosity, strength and solvent resistance.

There is a myriad of supports or substrates for membranes. Specific physical and chemical characteristics to be considered when selecting a suitable substrate include: porosity, surface porosity, pore size distribution of surface and bulk, permeability, solvent resistance, hydrophilicity, flexibility and mechanical integrity. Pore size distribution and overall surface porosity of the surface pores are of great importance when preparing a support for IFP.

An example of interfacial polymerization used to prepare TFC membranes are "Nylons", which belong to a class of polymers referred to as polyamides. One such polyamide is made, for example, by reacting a triacyl chloride, such as trimesoylchloride, with a diamine, such as m-phenylenediamine. The reaction can be carried out at an interface by dissolving the diamine in water and bringing a hexane solution of the triacyl chloride on top of the water phase. The diamine reacts with the triacyl chloride at the interface between these two immiscible solvents, forming a polyamide film at or near the interface which is less permeable to the reactants. Thus, once the film forms, the reaction slows down drastically, leaving a very thin film. In fact, if the film is removed from the interface by mechanical means, fresh film forms almost instantly at the interface, because the reactants are so highly reactive.

Numerous condensation reactions that can be used to interfacially make polymers have been described. Among the products of these condensation reactions are polyamides, polyureas, polyurethanes, polysulfonamides and polyesters (U.S. Pat. No. 4,917,800). Factors affecting the making of continuous, thin interfacial films include temperature, the nature of the solvents and cosolvents, and the concentration and the reactivity of monomers and additives. These polymers however have various disadvantages. Next to poor stability in for instance chlorinated solvents, the polyamides fail to sustain at temperatures higher than 450° C. and outside a pH range of 2-12 (Wang et al. "A polyamide-silica composite prepared by the sol-gel process" Polymer Bulletin, 31, 323-330, 1993). The drawbacks of this traditional IFP product has led to the demand of new, solvent stable membranes with similar performance.

Novel membranes are also needed since there is an interest in operating in organic solvent streams to separate small molecules such as synthetic antibiotics and peptides from organic solutions. In these types of applications, a high permeability is required for economical operation. Polar organic solvents, such as dipolar aprotic solvents, particularly solvents such as N-methyl pyrrolidone (NMP), dimethylacetamide (DMAC), and dimethylsulfoxide (DMSO) are used as solvents or media for chemical reactions to make pharmaceuticals and agrochemicals (for example, pyrethroid insecticides) industry. These powerful solvents will cause severe damage to commonly used polymeric membranes made from polysulfone, polyethersulfone, polyacrylonitrile or polyvinylidene fluoride polymers.

In many applications, it would also be useful for the membrane to operate with aqueous mixtures of solvents or with both aqueous solutions and solvent based solutions in series. For such uses, hydrophobic membranes are not useful as they have very low permeabilities for aqueous solutions.

This had led to a large demand of new, solvent stable membranes. It is an objective of the present invention to provide a highly efficient novel route for the production of such membranes.

SUMMARY OF THE INVENTION

The present invention provides a method for the preparation of thin film composite (TFC) membranes by interfacial polymerization (IFP) and the TFC membranes produced by this method. More particularly, the present invention provides an IFP method using a ring-opening polymerization reaction of epoxide monomers with nucleophilic monomers for making a thin film polymer coating on a porous support membrane, providing said novel TFC membranes. The present invention further provides a method for producing TFC membranes with improved stability in a broad range of pH, chemicals and temperature, for use in (nano) filtration of components in organic solvents such as polar aprotic solvents.

The present invention more particularly provides a method for the preparation of TFC membranes by interfacial polymerization on the surface of a porous support membrane, comprising the following steps: (a) impregnation of the porous support membrane with an aqueous solution containing a polyfunctional nucleophilic monomer; and (b) contacting the impregnated support membrane with a second substantially water-immiscible solvent containing a polyfunctional epoxide monomer, causing polymerization via a chemical reaction at the interface called ring-opening of epoxides.

DESCRIPTION

The present invention relates to a new method for preparation of thin film composite membranes (TFC) by interfacial polymerization (IFP) and TFC membranes produced by this method. More particularly, the present invention provides an IFP method using a ring-opening polymerization reaction of epoxide monomers with nucleophilic monomers for making adhesive polymer coatings on a porous support membrane, providing novel TFC membranes.

The scope of the applicability of the present invention will become apparent from the detailed description and drawings provided below. However, it should be understood that the detailed description and specific examples, while indicating preferred embodiments of the present invention, are given by way of illustration only since various changes and modifications within the spirit and scope of the invention will become apparent to those skilled in the art from this detailed description. Unless otherwise defined, all technical and scientific terms used herein have the same meaning as commonly understood by one of ordinary skill in the art to which this invention belongs.

One aspect of the present invention provides a method for preparation of TFC membranes comprising a thin film layer formed by IFP involving a ring-opening polymerization reaction of epoxide monomers with nucleophilic monomers. Preferably, said method comprises the following steps: (a) impregnation of a porous support membrane with an aqueous solution containing a polyfunctional nucleophilic monomer; and (b) contacting the impregnated support membrane with a second largely water-immiscible solvent containing a polyfunctional epoxide monomer.

Alternatively, the method of the present invention comprises the steps of (a) impregnation of a porous support membrane with a substantially water-immiscible solvent containing a polyfunctional epoxide monomer; and (b) contacting the impregnated support membrane with an aqueous solution containing a polyfunctional nucleophilic monomer.

Due to their ring strain (having a high thermodynamic driving force, usually greater than 20 kcal/mol), the usual reactivity of the epoxides by ring-opening can be enhanced by using a Lewis acid catalyst coordinating the oxygen atom. In a particular embodiment of the present invention, the epoxide monomer may be exposed to a catalyst either before, or preferably simultaneously with the step of contacting the nucleophilic monomer carrying porous support membrane with the organic solvent volume containing the epoxide monomer. Catalysts may include but are not limited to triethylamine, natriumhydroxide, $Cu(BF_4)_2$, $Na(BF_4)_2$, LiCl, $Sc(OTf)_3$, $NaClO_4$, $ZnBr_2$, $K_2CO_3$, $InCl_3$, ceric ammonium nitrate, $Na_2B_4O_7$, $LiClO_4$, N,N-benzyldimethylamine, tri-propylfosfine, hexylamine, LiOH, 2,4,6-tris(dimethylaminomethyl)phenol.

The method of the present invention optionally involves the addition of a base (acid acceptor), or a surfactant to reduce surface tension effects, or a combination thereof. With a base to act as an acid-scavenger, less catalyst is needed to obtain a comparable film. The temperature and time of contacting can vary, according to the kind and concentration of the reactants and the catalyst, but contacting is generally carried out from about 12 hours to 2 weeks, and preferably from 2 days to 4 days at room temperature.

The method of the present invention optionally involves that the TFC membrane may be washed to remove unreacted monomers, chemically treated with acids, bases, or other reagents to modify performance characteristics, treated with a humectant or protective coating and/or dried, stored in water until tested, further treated for environmental resistance, or otherwise used. Such post-treatments are well-known in the art (U.S. Pat. No. 5,234,598; U.S. Pat. No. 5,085,777; U.S. Pat. No. 5,051,178).

One embodiment of the present invention provides the preparation of TFC membranes by interfacial polymerization, comprising the following steps:

(a) impregnating a porous support membrane optionally comprising a first conditioning agent, with a polyfunctional nucleophilic monomer solution comprising:

(i) an aqueous first solvent for the said polyfunctional nucleophilic monomer; (ii) said polyfunctional nucleophilic monomer; (iii) optionally, an activating solvent; and (iv) optionally, additives including alcohols, ketones, ethers, esters, halogenated hydrocarbons, nitrogen-containing compounds and sulphur-containing compounds, monohydric aromatic compounds;

wherein said support membrane is stable in polar aprotic solvents;

(b) contacting the impregnated porous support membrane with a polyfunctional epoxide monomer solution comprising:

(i) a substantially water-immiscible second solvent for the polyfunctional epoxide monomer; (ii) a polyfunctional epoxide monomer; (iii) optionally, an activating solvent; and (iv) optionally, additives including alcohols, ketones, ethers, esters, halogenated hydrocarbons, nitrogen-containing compounds and sulphur-containing compounds, monohydric aromatic compounds;

wherein the aqueous first solvent ((a)(i)) and the immiscible second solvent ((b)(i)) form a two phase system;

(c) optionally, treating the resulting asymmetric membrane with an activating solvent; and, (d) optionally, impregnating the resulting composite membrane with a second conditioning agent.

Membrane Casting

A porous support membrane for use in the method according to the present invention can be prepared as follows: a polymer solution is casted onto a suitable porous substrate, from which it then may be removed. Casting of the membrane may be performed by any number of casting procedures cited in the literature, for example U.S. Pat. No. 3,556,305; U.S. Pat. No. 3,567,810; U.S. Pat. No. 3,615,024; U.S. Pat. No. 4,029,582 and U.S. Pat. No. 4,188,354; GB-A-2,000,720; Office of Saline Water R & D Progress Report No. 357, October 1967; Reverse Osmosis and Synthetic Membranes, Ed. Sourirajan; Murari et al, J. Membr. Sci. 16: 121-135 and 181-193, 1983.

Alternatively, a porous support membrane for use in the method according to the present invention can be prepared as follows: once the desired polymer casting solution is prepared (i.e. polymers are dissolved in a suitable solvent system, and optionally organic or inorganic matrices are added into the casting solution so that the matrices are well dispersed) and, optionally, filtered by any of the known processes (e.g. pressure filtration through microporous filters, or by centrifugation), it is casted onto a suitable porous substrate, such as glass, metal, paper, plastic, etc., from which it may then be removed. Preferably, the desired polymer casting solution is casted onto a suitable porous substrate from which the membrane is not removed. Such porous substrate can take the form of an inert porous material which does not hinder the passage of permeate through the membrane and does not react with the membrane material, the casting solution, the gelation bath solvent, or the solvents which the membrane will be permeating in use.

Such porous substrates may be non-woven, or woven, including cellulosics (paper), polyethylene, polypropylene, nylon, vinyl chloride homo- and co-polymers, polystyrene, polyesters such as polyethylene terephthalate, polyvinylidene fluoride, polytetrafluoroethylene, polysulfones, polyether sulfones, poly-ether ketones (PEEK), polyphenylene oxide, polyphenyline sulphide (PPS), Ethylene-(R) ChloroTriFluoroEthylene (Halar® ECTFE), glass fibers, metal mesh, sintered metal, porous ceramic, sintered glass, porous carbon or carbon fibre material, graphite, inorganic membranes based on alumina and/or silica (possibly coated with zirconium and/or other oxides). The membrane may otherwise be formed as a hollow fiber or tubelet, not requiring a support for practical use; or the support may be of such shape, and the membrane is casted internally thereon.

Conditioning

Preferably, the porous support membrane is impregnated with a first conditioning agent dissolved in a solvent to impregnate the porous support membrane prior to the interfacial polymerization reaction. The term "conditioning agent" is used herein to refer to any agent which, when impregnated into the support membrane prior to the interfacial polymerization reaction, provides a resulting membrane with a higher rate of flux after drying. This conditioning agent may be, but is not limited to, a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols). Suitable solvents for dissolving the conditioning agent include water, alcohols, ketones, aromatics, hydrocarbons, or mixtures thereof.

Following treatment with the conditioning agent, the support membrane is typically dried in air at ambient conditions to remove residual solvent.

Nucleophilic Monomers

The term "nucleophilic monomer" as used herein encompasses monomers with two or more nucleophilic functional groups capable of forming a polymer with a selected electrophilic monomer. Depending on the size of the compound, more than two nucleophilic functional groups may be accommodated to promote crosslinking. For the purpose of this invention, "nucleophilic monomer" encompasses any compound with at least two nucleophilic functional groups which react in a manner analogous to the amines in the polymerization reactions described herein. Nucleophilic functional groups include amino, hydroxyl, mercaptan, amide and other functional groups with a replaceable hydrogen atom (Morales, G. A. "Combinatorial chemistry", volume 369, 2003).

The "ring-opening reaction" as used herein refers to the epoxide ring that reacts with chemicals with different structures, especially those that have activated hydrogen atoms such as but not limited to alcohols, amines, carboxylic acids, thiols, phenoles and acid anhydrides. Among them, primary and secondary amines are the most widely used curing agents for epoxy resins. A primary amine reacts with an epoxy group to produce a secondary amine and a secondary alcohol. The secondary amine can further react with an epoxy group to form a tertiary amine (Scheme 1). No competitive reaction is detected between an epoxy group and a secondary alcohol when a stoichiometric equivalent or excess amine is used.

Scheme 1.

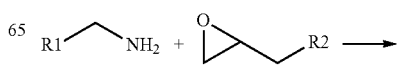

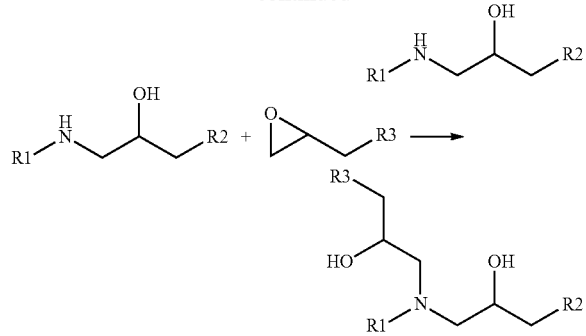

As example, nucleophilic monomers having amino groups as the nucleophilic functional group include: (a) aromatic primary diamines, such as a m-phenylenediamine and p-phenylenediamine and substituted derivatives thereof, wherein the substituent includes, e.g., an alkyl group, such as a methyl or ethyl group; an alkoxy group, such as methoxy or ethoxy; a hydroxyalkyl group; a hydroxy group or a halogen atom; nitro groups; cyano groups; carboxylic or sulfonic acid groups; amide groups; (b) aromatic primary triamines, such as 1,2,4- and 1,3,5-triaminobenzene; (c) aromatic secondary diamines, such as N,N'-diphenylethylene diamine, N-methyl-m-phenylenediamine, N,N'-dimethyl-m-phenylenediamine, and the like; (d) cycloaliphatic primary diamines, such as cyclohexane diamine; (e) cycloaliphatic secondary diamines, such as piperazine and trimethylene dipiperidine; and (f) xylene diamines such as m-xylenediamine.

Aliphatic nucleophilic monomers include both straight chain and branched hydrocarbons containing 2-15 carbon atoms, inclusive, with at least two amino groups. Determination of the number and size of branches or substitutions is intended to permit satisfactory polymer formation. Thus, sterically hindered amines, or a branched structure with two amino groups very close together should be avoided for polymer membrane formation, although such amines may be desirable for linear or oligomer fiber formation.

Nucleophilic monomers include diamine compounds of the following formula (I):

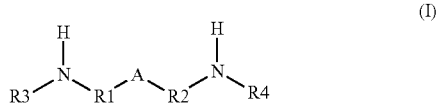

(I)

wherein A represents a aliphatic, heterocyclic, or aromatic group, i.e. a group having 2 to 8 carbon atoms, including a divalent alicyclic group, a divalent aromatic group, or a divalent heteroaromatic group;

where $R_1$ and $R_2$ are each an independently selected alkylene or alkenylene group having from 0 to 8 carbons atoms, inclusive; and wherein $R_3$ and $R_4$ are independently selected from the group consisting of: hydrogen; halogen; aliphatic, heterocyclic, or aromatic group, i.e. a group having from 2 to 8 carbon atoms, including a divalent alicyclic group, a divalent aromatic group, or a divalent heteroaromatic group. In addition, $R_1$ and $R_3$, for example, may be taken together to be a heterocyclic or alicyclic group. In addition, $R_2$ and $R_4$, for example, may be taken together to be a heterocyclic or alicyclic group.

Preferred nucleophilic substituents include primary amino, secondary amino, primary phosphino, secondary phosphino, sulfhydryl and hydroxyl substituents.

The positional geometry of the nucleophilic substituents of aromatic monomers may be ortho, or preferably meta or para to allow suitable cross-linking and extension without steric hindrance. The positional geometry may depend upon the length and geometry of $R_1$ and $R_2$ Additional and optional substituents on A, such as halogen, may have any positional geometry in general accordance with the principles of electronic effects of cyclic compounds. In addition to the diamine compounds described above, analogous triamine compounds may also be used. Additional examples of individual nucleophilic monomers are provided by U.S. Pat. No. 4,830,885, U.S. Pat. No. 4,761,234, and U.S. Pat. No. 4,619,767. Nonlimiting examples of aromatic amines known to produce commercially useful polymer membranes are m-phenylenediamine, p-phenylenediamine, hexanediamine and p-xylenediamine. Preferred nucleophilic monomers include aromatic primary diamines and triamines.

Preferably, the nucleophilic monomer for use in a method according to the invention is selected from the group comprising polyethylenimines; reaction products of ethylene diamine, piperazine, methyl piperazine, dimethyl piperazine and/or homopiperazine with a polyepihalohydrin; amine terminated polyamide oligomers such as copolymers of isophthaloyl chloride with an excess of meta phenylene diamine; cyclohexane diamines; cyclohexane triamines; xylylene diamines; phenylene diamines such as meta phenylene diamine and para phenylene diamine; chlorophenylene diamines such as 4- or 5-chloro-metaphenylene diamine; benzene triamines such as 1,3,5-benzene triamine; bis (aminobenzyl) aniline; tetra amino benzenes; tetra amino biphenyls e.g. 3,3',4,4,' tetra amino biphenyl; tetrakis (aminomethyl) methane; piperazine; methyl piperazine; dimethyl piperazine such as 2,5-dimethyl piperazine; homopiperazine; diamino-diphenyl methanes; N,N'-diphenyl ethylenediamine; aminobenzamides such as 4-amino-benzamide; aminobenzhydrazides; bis(aminobenzyl)anilines; bis(alkylamino)phenylenediamines such as N,N'-dimethyl-1,3-phenylenediamine; melamine; mono(alkylamino)phenylenediamines such as N-methyl-1,3-phenylenediamine; aminomethylpiperidine; triamino-hydroxy-pyrimidines such as 2,4,5-triamino-6-hydroxy pyrimidine or 4,5,6-triamino-2-hydroxy pyrimidine; triamino-pyrimidines such as 2,4,6-triamino-pyrimidine or 4,5,6-triamino-pyrimidine; tetra amino pyrimidines such as 2,4,5,6-tetra amino pyrimidine; para rosaniline; tris (aziridinyl) propionates (e.g. trimethylol propane-tris(β-(N-aziridinyl) propionate or pentaerythritol-tris β(N-aziridinyl) propionate); tetra amino biphenyls; bis(amino benzyl)anilines; phenoles; and acid anhydrides.

More preferably, the nucleophilic monomer is selected from the group consisting of triaminobenzene, piperazine, 4-aminomethylpiperidine, 1,4-phenylene diamine (PPD), 1,3-phenylene diamine (MPD) and hexanediamine.

Nucleophilic monomers which are larger, more polar, more hydrophilic, or a combination thereof are expected to diffuse more slowly into the organic solvent phase. Furthermore, once oligomer condensation products begin to form at the organic/aqueous interface, steric and polar effects may limit the diffusion of the monomer through the film formed at such interface.

The majority of nucleophilic monomers employed in epoxy systems provide a substantial contribution to the properties of the crosslinked products. Thus the choice of curing agent is very important and needs to be considered very carefully. This is particularly true for modifications of epoxy resins, where the curing agents can influence the curing chemistry, the curing rate, crosslinking density, morphology, etc. and eventually affect the fracture toughness of modified epoxy resins.

It is further preferred that, the solution which carries the nucleophilic monomer comprises water and the nucleophilic monomer in an amount in the range of 0.1-20% by weight. The concentration of the nucleophilic monomer in the aqueous solution is determined, in part, upon the number and basicity of the amine groups per monomer molecule, the method of transferring the nucleophilic monomer to the porous support membrane, and the desired performance characteristics. The pH of the solution should be in the range of from about 6 to about 12. This substantially aqueous solution may or may not contain a solvent capable of dissolving or plasticizing the porous support membrane. While this type of method is generally practiced with an exclusively aqueous solvent, U.S. Pat. No. 4,950,404, discloses an enhancement of flux when dissolving or plasticizing solvents such as the polar aprotic tetrahydrofuran, dimethylformamide, N-methylpyrrolidone, acetone and sulfolane are used in concentrations of about 1-20% in the aqueous polyamine solution.

Epoxide Monomers

The term "epoxide monomer" refers to compounds having at least two or more epoxy substituents which are capable of reacting with primary and secondary nucleophilic functional groups possessing a replaceable proton such as the hydroxyl group, amide groups, mercaptan groups, or combinations thereof.

A general structure for the epoxide monomer can be portrayed as follows by formula (II):

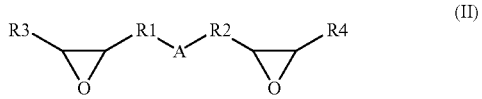

wherein A represents an aliphatic, heterocyclic, or aromatic group, i.e. a group having 2 to 8 carbon atoms, including a divalent alicyclic group, a divalent aromatic group, or a divalent heteroaromatic group;

where $R_1$ and $R_2$ are each an independently selected alkylene or alkenylene group having from 0 to 8 carbons atoms; and wherein $R_3$ and $R_4$ are independently selected from the group consisting of: hydrogen; halogen; aliphatic, heterocyclic, or aromatic group, i.e. a group having from 2 to 8 carbon atoms, including a divalent alicyclic group, a divalent aromatic group, or a divalent heteroaromatic group. In addition, $R_1$ and $R_3$, for example, may be taken together to be a heterocyclic or alicyclic group. In addition, $R_2$ and $R_4$, for example, may be taken together to be a heterocyclic or alicyclic group.

Preferably, the epoxide monomer is selected from the group comprising bisphenol-A-diglycidyl-ether; neopentylglycol diglycidylether; trimetylolpropane triglycidylether; 1,4-butanediol diglycidylether; 3 (triglycidyl-p-aminophenol; tetraglycidyl-4,4'-diaminodiphenylmethane); and 5 (diglycidyl ester of hexahydrophthalic acid).

It is further preferred that, the solvent for the epoxide reagents is a relative non-solvent for the reaction product, or oligomer, and is relatively immiscible in the nucleophilic solvent. In a preferred embodiment of the present invention, the threshold of immiscibility is as follows: an organic solvent should be soluble in the nucleophilic solvent not more than between 0.01 weight percent and 1.0 weight percent. Suitable organic solvents for the epoxide include but are not limited to hydrocarbons and halogenated hydrocarbons such as n-pentane, n-hexane, octane, cyclohexane, toluene, naphtha, and carbon tetrachloride.

Interfacial Polymerization

As used herein, the term "interfacial polymerization" refers to a polymerization reaction that occurs at or near the interfacial boundary of two largely immiscible solutions, matching the surface of a porous supporting ultrafiltration membrane.

The interfacial polymerization reaction is generally held to take place at the interface between a polyfunctional nucleophilic monomer solution, and a polyfunctional epoxide monomer solution, which form two phases. Each phase may include a solution of a single type of dissolved polyfunctional monomers or a combination of different types of polyfunctional monomers. Concentrations of the dissolved monomers may vary. Variables in the system may include, but are not limited to, the nature of the solvents, the nature of the monomers, monomer concentrations, use of additives in any of the phases, reaction temperature and reaction time. Such variables may be controlled to define the properties of the membrane, e.g., membrane selectivity, flux, top layer thickness. The interfacial polymerization reaction provides a polymer film on a surface of the porous support membrane.

Treating the Resulting Assymetric TFC Membrane with an Activating Solvent

In the method according to the present invention, the post-treatment step (c) preferably includes treating the resulting TFC membranes prior to use for (nano)filtration with an activating solvent, including, but not limited to, polar aprotic solvents. In particular, activating solvents include DMAc, NMP, DMF and DMSO. The "activating solvent" as referred to herein is a liquid that enhances the TFC membrane flux after treatment. The choice of activating solvent depends on the top layer and membrane support stability. Contacting may be effected through any practical means, including passing the TFC membrane through a bath of the activating solvent, or filtering the activating solvent through the composite membrane.

More preferably, the composite membrane may be treated with an activating solvent during or after interfacial polymerization. Without wishing to be bound by any particular theory, the use of an activating solvent to treat the membrane is believed to flush out any debris and unreacted material from the pores of the membrane following the interfacial polymerization reaction. The treatment of the composite membrane with an activating solvent provides a membrane with improved properties, including, but not limited to, membrane flux.

Conditioning

In the method according to the present invention, the resulting TFC membrane is impregnated with a second conditioning agent dissolved in a water or organic solvent to impregnate the support membrane after the interfacial polymerization reaction (step (d)). The term "conditioning agent" is used herein to refer to any agent which, when impregnated into the support membrane after the interfacial polymerization reaction, provides a resulting membrane with a higher rate of flux after drying.

The "first conditioning agent" and "second conditioning agent" as referred to herein may be the same, or a different agent. This second conditioning agent may therefore also be, but is not limited to, a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols). Suitable solvents for dissolving the conditioning agent include water, alcohols, ketones, aromatics, hydrocarbons, or mixtures thereof.

Following treatment with the conditioning agent, the TFC membrane is typically dried in air at ambient conditions to remove residual solvent.

Suitable epoxide monomer preparations and nucleophile monomer preparations, respectively, are available as components of epoxy two component glues. Such epoxy two component glues are commercially available and marketed under the trade names including but not limited to Araldite®, Pattex®, Loctite®, Uhu®, Akfix®, Förche, 3M™, Sikadur®, G-Flex®, Quartel® and Eurocol®, or marketed by companies including but not limited to Reynchemie or Bison. Therefore, the present invention further provides the use of the nucleophilic monomer-containing and epoxide monomer-containing components of such glues in the preparation of TFC membranes according to the method of the present invention.

The resultant high flux semipermeable TFC membranes of the present invention can be used for (nano)filtration operations, particularly in organic solvents, and more particularly (nano)filtration operations in polar aprotic solvents.

EXAMPLES

Example 1

An 18 wt % P1700 polysulfone (Sigma Aldrich) solution in NMP (Across) was prepared. The solution was cast onto a porous non-woven PP/PE substrate (Novatex 2471, Freudenberg). The cast membrane was solidified in a coagulation bath containing demineralized water. The obtained support membranes were immersed in 2 w/v % hexanediamine (HDA) in water for 1 h. Afterwards, the immersed membrane was placed in an IFP set-up where it was brought into contact with 2 w/v % neopentylglycol diglycidyl ether (NPG) in hexane for 2 days. Filtration with 35 µM rosebengal in water are summarized in table 1.

TABLE 1

| Membrane | Permeation (L/m$^2$bar · h) | Rejection (%) |
| --- | --- | --- |
| 2 w/v % HDA-2 w/v % NPG | 0.2 | 56.3 |

Example 2

An 14 wt % polyimide Matrimid (Lindberg & Lund AS) solution in NMP and THF (3/1) (Across) was prepared. The solution was cast onto a porous non-woven PP/PE substrate (Novatex 2471, Freudenberg). The cast membrane was solidified in a coagulation bath containing a solution of hexanediamine in demineralized water for 2.5 hours for crosslinking of support layer and subsequent impregnation for IFP. Afterwards, the immersed membrane was placed in an IFP set-up where it was brought into contact with 2 w/v % bisphenol-A-diglycidylether for 48 h under N$_2$-atmosphere. Just before filtration the membranes were washed with water. Filtration-results with 35 µM rosebengal in water are summarized in table 2.

TABLE 2

| Hexanediamine (wt %) | Permeation (L/m$^2$bar · h) | Rejection (%) |
| --- | --- | --- |
| 2 | 0.0036 | 97.2 |
| 5 | 0.0020 | 94.5 |
| 10 | 0.0012 | 90 |

Example 3

An 14 wt % polyimide Matrimid (Lindberg & Lund AS) solution in NMP and THF (3/1) (Across) was prepared. The solution was cast onto a porous non-woven PP/PE substrate (Novatex 2471, Freudenberg). The cast membrane was solidified in a coagulation bath containing a solution of hexanediamine in demineralized water for 2.5 hours for crosslinking of support layer and subsequent impregnation for IFP. Afterwards, the immersed membrane was placed in an IFP set-up where it was brought into contact with 2 w/v % bisphenol-A-diglycidylether for 48 h under N$_2$-atmosphere. Just before filtration the membranes were washed with water. Filtration-results with 35 µM methylorange in water are summarized in table 3.

TABLE 3

| Hexanediamine (wt %) | Permeation (L/m$^2$bar · h) | Rejection (%) |
| --- | --- | --- |
| 2 | 0.0036 | 96.6 |
| 5 | 0.0016 | 96.3 |
| 10 | 0.0009 | 93.5 |

Example 4

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water and x M hexanediamine (HDA) for 1 h. Afterwards, the immersed membrane was placed in an IFP set-up where it was brought into contact with 0.1 M bisphenol A diglycidyl ether (BADGE) in toluene for 2 days under nitrogen atmosphere. Filtration-results with 35 µM rosebengal in water are summarized in table 4.

TABLE 4

| Composition | Permeation (L/m$^2$bar · h) | Rejection (%) |
| --- | --- | --- |
| 0.25M HDA-0.1M BADGE | 2.6 | 32 |
| 0.5M HDA-0.1M BADGE | 4.1 | 22 |
| 0.75M HDA-0.1M BADGE | 3.6 | 25 |

Example 5

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water and 2 w/v % hexanediamine (HDA) for 1 h. Afterwards, the immersed membrane was placed in an IFP set-up where it was brought into contact with 2 w/v % bisphenol A diglycidyl ether (BADGE) in toluene for x days under nitrogen atmosphere. Filtration-results with 35 μM rosebengal in water are summarized in table 5.

TABLE 5

| Reaction time | Permeation (L/m²bar · h) | Rejection (%) |
|---|---|---|
| 3 days | 1.6 | 54 |
| 6 days | 0.35 | 91 |
| 9 days | 0.033 | 91 |

Example 6

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water and 0.1 M triethyltetramine (TETA) for 1 h. Afterwards, the immersed membrane was placed in an IFP set-up where it was brought into contact with 0.5 M bisphenol A diglycidyl ether (BADGE) in toluene for 4 days under nitrogen atmosphere. Filtration-results with 35 μM rosebengal in water are summarized in table 6.

TABLE 6

| Permeation (L/m²bar · h) | Rejection (%) |
|---|---|
| 8 | 55.3 |

Example 7

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with 2 w/v % neopentyl glycol diglycidyl ether (NPG) in toluene for x days. Filtration-results with 35 μM rosebengal in water are summarized in table 7.

TABLE 7

| Reaction time | Permeation (L/m²bar · h) | Rejection (%) |
|---|---|---|
| 1 day | 0.01 | 94.8 |
| 2.5 days | 0.02 | 95.7 |

Example 8

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with x w/v % neopentyl diglycidyl ether (NPG) in toluene for 2.5 days. Filtration-results with 35 μM rosebengal in water are summarized in table 8.

TABLE 8

| Composition | Permeation (L/m²bar · h) | Rejection (%) |
|---|---|---|
| 2 w/v % HDA-2 w/v % NPG | 0.004 | 98.0 |
| 2 w/v % HDA-5 w/v % NPG | 0.05 | 99.5 |
| 2 w/v % HDA-7.5 w/v % NPG | 0.06 | 99.5 |

Example 9

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with x w/v % neopentyl diglycidyl ether (NPG) in toluene for 2.5 days. Filtration-results with 35 μM rosebengal in water are summarized in table 9.

TABLE 9

| Composition | Permeation (L/m²bar · h) | Rejection (%) |
|---|---|---|
| 2 w/v % HDA-2 w/v % NPG | 0.004 | 98.0 |
| 2 w/v % HDA-5 w/v % NPG | 0.05 | 99.5 |
| 2 w/v % HDA-7.5 w/v % NPG | 0.06 | 99.5 |

Example 10

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with x w/v % neopentyl diglycidyl ether (NPG) in toluene for 2.5 days. Filtration-results with 35 μM rosebengal in ethanol are summarized in table 10.

TABLE 10

| Composition | Permeation (L/m²bar · h) | Rejection (%) |
|---|---|---|
| 2 w/v % HDA-2 w/v % NPG | 1.76 | 98.3 |
| 2 w/v % HDA-5 w/v % NPG | 1.02 | 98.4 |

Example 11

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with 2 w/v % neopentyl glycol diglycidyl ether (NPG) in toluene for x days. Filtration-results with 35 µM rosebengal in ethanol are summarized in table 11.

TABLE 11

| Reaction time | Permeation (L/m²bar · h) | Rejection (%) |
| --- | --- | --- |
| 1 day | 1.34 | 98.3 |
| 2.5 days | 1.76 | 98.4 |

Example 12

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with x w/v % neopentyl glycol diglycidyl ether (NPG) in toluene for 2.5 days. Prior to filtration, the membranes were stored in DMF for 24 h. Filtration-results with 35 µM rosebengal in ethanol are summarized in table 12.

TABLE 12

| Composition | Permeation (L/m²bar · h) | Rejection (%) |
| --- | --- | --- |
| 2 w/v % HDA-2 w/v % NPG | 0.05 | 96.3 |
| 2 w/v % HDA-5 w/v % NPG | 2.41 | 79.8 |
| 2 w/v % HDA-7.5 w/v % NPG | 9.47 | 53.1 |

Example 13

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with x w/v % neopentyl glycol diglycidyl ether (NPG) in toluene for 2.5 days. Filtration-results with 35 µM rosebengal in dimethylformamide (DMF) are summarized in table 13.

TABLE 13

| Composition | Permeation (L/m²bar · h) | Rejection (%) |
| --- | --- | --- |
| 2 w/v % HDA-2 w/v % NPG | 4.39 | 3.3 |
| 2 w/v % HDA-5 w/v % NPG | 5.72 | 4.9 |
| 2 w/v % HDA-7.5 w/v % NPG | 4.18 | 5.7 |

Example 14

An 14 wt % polyimide (Matrimid) solution in NMP/THF (3/1) (Across) was prepared. The solution was cast onto a porous non-woven PP/PE substrate (Novatex 2471, Freudenberg). The cast membrane was subjected to an evaporation step of 30 seconds. Afterwards the cast membrane was solidified in a coagulation bath containing demineralized water. The obtained support membranes were immersed in 2 w/v % hexanediamine (HDA) in methanol for 1 h Afterwards, the immersed membrane was placed in an IFP set-up where it was brought into contact with x w/v % neopentyl glycol diglycidyl ether (NPG) in toluene for 2.5 days. Filtration-results with 35 µM rosebengal in isopropylalcohol (IPA) are summarized in table 14.

TABLE 14

| Composition | Permeation (L/m²bar · h) | Rejection (%) |
| --- | --- | --- |
| 2 w/v % HDA-2 w/v % NPG | 0.25 | 83.9 |
| 2 w/v % HDA-5 w/v % NPG | 0.23 | 90.1 |
| 2 w/v % HDA-7.5 w/v % NPG | 0.19 | 90.6 |

Example 15

A 14 wt % polyimide (Matrimid) solution in NMP/THF (3/1) (Across) is prepared. The solution is cast onto a porous non-woven PP/PE support (Novatex 2471, Freudenberg). The cast membrane is subjected to an evaporation step of 30 seconds. Thereafter, the cast membrane is solidified in a coagulation bath containing demineralized water. The obtained support membranes are immersed in 2 w/v % curing agent of the commercial available 'Pattex power epoxy super mix universal 1 min' in methanol for 1 h. Thereafter, the immersed membrane is placed in an IFP set-up where it is brought into contact with 2 w/v % epoxy of the commercial available 'Pattex power epoxy super mix universal 1 min' in hexane for 2 days.

The invention claimed is:
1. A method for synthesis of thin film composite membranes by interfacial polymerization comprising:
   a) impregnation of an ultrafiltration porous support membrane with an aqueous solution containing a polyfunctional nucleophilic monomer; and
   b) contacting the impregnated support membrane with a second largely water-immiscible organic solvent containing a polyfunctional epoxide monomer.
2. The method of claim 1, wherein the nucleophilic monomer is selected from the group consisting of polyethylenimines; reaction products of ethylene diamine, piperazine, methyl piperazine, dimethyl piperazine and/or homopiperazine with a polyepihalohydrin; amine terminated polyamide oligomers; cyclohexane diamines; cyclohexane triamines; xylylene diamines; phenylene diamines; chlorophenylene diamines; benzene triamines; bis (aminobenzyl) aniline; tetra amino benzenes; tetra amino biphenyls; tetrakis

(aminomethyl) methane; piperazine; methyl piperazine; dimethyl piperazine; homopiperazine; diamino-diphenyl methanes; N,N'-diphenyl ethylenediamine; aminobenzamides; aminobenzhydrazides; bis(aminobenzyl)anilines; bis(alkylamino)phenylenediamines; melamine; mono(alkylamino)phenylenediamines; aminomethylpiperidine; triamino-hydroxy-pyrimidines; triamino-pyrimidines; tetra amino pyrimidines; para rosaniline; tris (aziridinyl) propionates; tetra amino biphenyls; bis(amino benzyl)anilines; phenoles; and acid anhydrides.

3. The method of claim 1, wherein the nucleophilic monomer is selected from the group consisting of triaminobenzene, piperazine, 4-aminomethylpiperidine, 1,4-phenylene diamine (PPD), 1,3-phenylene diamine (MPD) and hexanediamine.

4. The method of claim 1, wherein the epoxide monomer is selected from the group consisting of bisphenol-A-diglycidyl-ether; neopentylglycol diglycidylether; trimetylolpropane triglycidylether; 1,4-butanediol diglycidylether; 3 (triglycidyl-p-aminophenol; tetraglycidyl-4,4'-diaminodiphenylmethane); and 5 (diglycidyl ester of hexahydrophthalic acid).

5. A thin film composite membrane prepared by the method according to claim 1.

6. A method for separating components, the method comprising nanofiltering the components with the thin film composite membrane of claim 5.

7. The method of claim 6, wherein the components are suspended in an organic solvent.

8. The method of claim 7, wherein the organic solvent comprises a polar aprotic solvent.

* * * * *